May 2, 1961 P. ZERHAN, JR 2,982,324
CLIP
Filed Aug. 16, 1956

INVENTOR.
Peter Zerhan, Jr.
BY
L. D. Burch
ATTORNEY

United States Patent Office 2,982,324
Patented May 2, 1961

2,982,324
CLIP
Peter Zerhan, Jr., Dearborn, Mich., assignor to General Motors Corporation, Detroit, Mich., a corporation of Delaware Filed Aug. 16, 1956, Ser. No. 604,560
3 Claims. (Cl. 151—41.75)

This invention relates to a sheet metal clip and particularly to such a clip adapted to hold two plates together at substantially right angles to each other.

The clip herein disclosed is especially applicable to the assembly of surfaces to be held at an angle relative to each other. In assembling individual transverse and longitudinal members at right angles a clip is needed which may be easily attached and detached and yet will hold the members firmly in position. This clip meets these requirements by use of a single threaded attachment and stamped retaining lugs.

Referring to the drawings.

Figure 1:
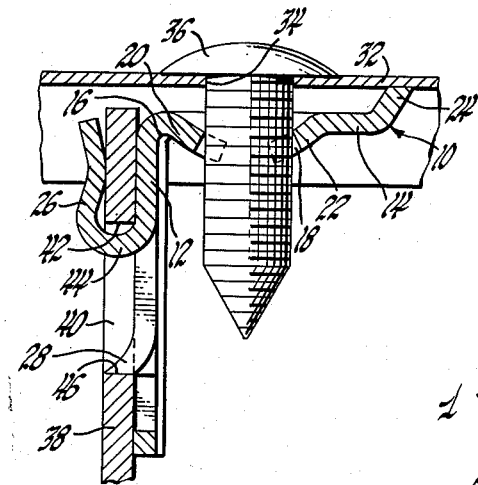
Figure 1 is a sectional view taken on lines 1—1 of Figure 2 and showing a clip in its installed position and embracing the invention.
Figure 2:
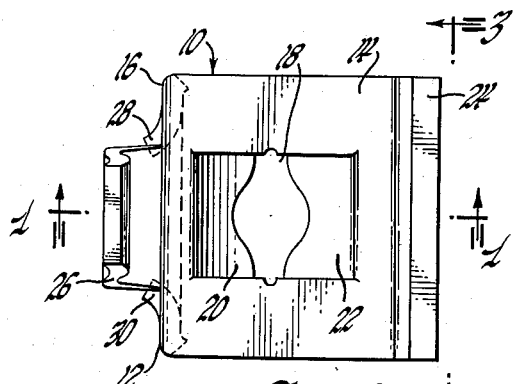
Figure 2 shows a top view of the clip of Figure 1.
Figure 3:
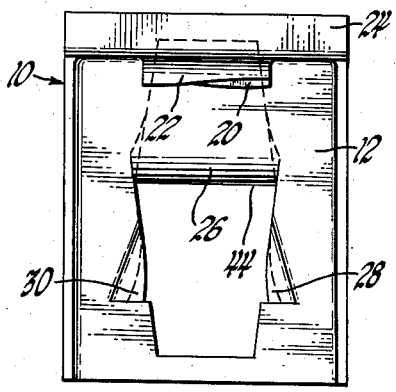
Figure 3 is a view of the clip taken on the lines 3—3 of Figure 2.
Figure 4:
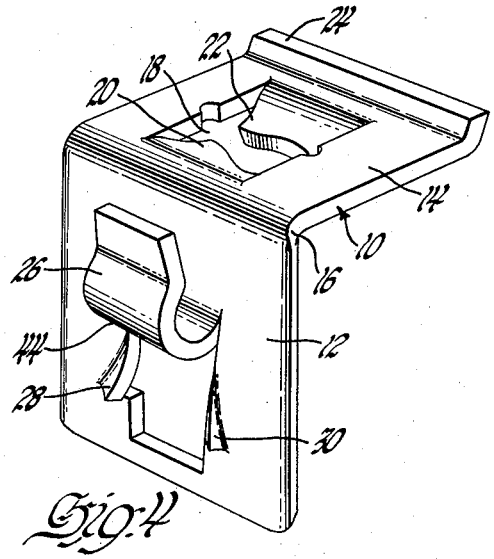
Figure 4 is a perspective view of the clip.

Clip or fastener 10 is formed of a strip of sheet metal and has legs 12 and 14 formed by bending the strip at 16 to approximately a 90° angle. Leg 14 is provided with a bolt receiving opening 18 formed by striking prongs 20 and 22 out of the plane of leg 14. Prongs 20 and 22 are shaped to conform to the thread of bolt 36 and project from the undersurface of the plane of leg 14. The end of leg 14 is upwardly offset to provide a projection 24. A tongue 26 is struck out of the center portion of leg 12 and return bent to form a hook extending from the outer side of leg 12. Tabs 28 and 30 are struck from intermediate sections of either side of the aperture remaining in leg 12 after tongue 26 is struck and bent into position.

As shown in Figure 1, the clip is attached to a plate 32 which has a bolt receiving opening 34 therein. A second plate 38, to be secured at a right angle to plate 32, is provided with a clip receiving aperture 40. Tongue 26 of clip 10 is inserted into aperture 40 and a bolt 36 is inserted into opening 34 and into threaded engagement with prongs 20 and 22. When bolt 36 is tightened, clip 10 is pulled toward plate 32 and tongue 26 passes around edge 42 of aperture 40. Aperture 40 is so dimensioned relative to tongue 26 and tabs 28 and 30 that when the bent portion 44 of tongue 26 has its interior surface in engagement with edge 42, tabs 28 and 30 will snap into aperture 40 and bear against edge 46 of aperture 40. Leg 12 will then be immediately adjacent and parallel to plate 38 while tongue 26 will extend through aperture 40 and in engagement with edge 42 at its bent section 44 and also in engagement with the side of plate 38 opposite leg 12. Tabs 28 and 30 will extend into aperture 40, holding the clip tightly secured to plate 38. Projection 24 will also have been brought into engagement with plate 32 and when bolt 36 is fully tightened will provide a resilient engaging surface.

The clip may also be installed by first fastening it to plate 38 with tongue 26 and tabs 28, 30, then attaching it to plate 32 with bolt or screw 36, or it may be first loosely fastened to plate 32 by bolt 36 after which tongue 26 may be inserted in aperture 40. When bolt 36 is tightened, the clip is pulled into position.

When clip 10 is in its installed position it is tightly fitted to both plates 32 and 38 and will not move relative to either plate. The plates will be held at the correct relative angle and may be easily disassembled by loosening bolt 36.

What is claimed is:
1. A fastener adapted to hold two walls at substantially right angles including a first portion adjacent and parallel to one of said walls throughout the length thereof, said one wall having an aperture, said first portion having a tongue struck therefrom and bent approximately 180° to form a hook, tabs struck and extending outwardly from said first portion on the same side as said hook, said hook adapted to extend through the aperture in said first portion and said tabs adapted to engage one side of said aperture, and a second portion having a bolt receiving opening and a resilient projection extending from the plane thereof for resiliently engaging said second wall, said second wall having an opening complementary to said bolt receiving opening and adapted to receive a bolt therethrough.

2. A fastener including a member having a portion thereof bent at a right angle thereto, said member having a tongue punched therefrom and reversely bent toward said right angle to extend from the side of said member opposite said portion, laterally spaced tabs offset from said member at opposite inner edges of the aperture formed by said punched tongue, said portion having a split protuberance having an opening adapted to receive a threaded element, and a resilient end projection extending angularly therefrom for resiliently engaging said fastener with a member being fastened.

3. A fastener having first and second portions angularly disposed to each other, said first portion having integral bolt engaging means and an offset shoulder, said second portion being flat throughout, and the axis of said means being parallel to the plane of said second portion, a return bent hook integrally formed from said second portion to project outwardly therefrom and generally parallel thereto, and at least one tab integrally formed from said second portion and projecting outwardly therefrom, said hook and tab coacting to secure said second portion to a first sheet metal plate, said shoulder and said bolt engaging means cooperating with a bolt threaded through said means to apply leverage with said shoulder as a fulcrum to tighten said first plate against a second plate.

References Cited in the file of this patent
UNITED STATES PATENTS

| | | |
|---|---|---|
| 876,436 | Cantwell | Jan. 14, 1908 |
| 2,286,696 | Tinnerman | June 16, 1942 |
| 2,542,883 | Tinnerman | Feb. 20, 1951 |
| 2,661,821 | Tinnerman | Dec. 8, 1953 |
| 2,676,635 | Tinnerman | Apr. 27, 1954 |
| 2,708,088 | Steinke | May 10, 1955 |
| 2,729,411 | Cahill | Jan. 3, 1956 |
| 2,771,113 | Flora | Nov. 20, 1956 |
| 2,873,496 | Elms | Feb. 17, 1959 |